United States Patent Office 2,781,709
Patented Feb. 19, 1957

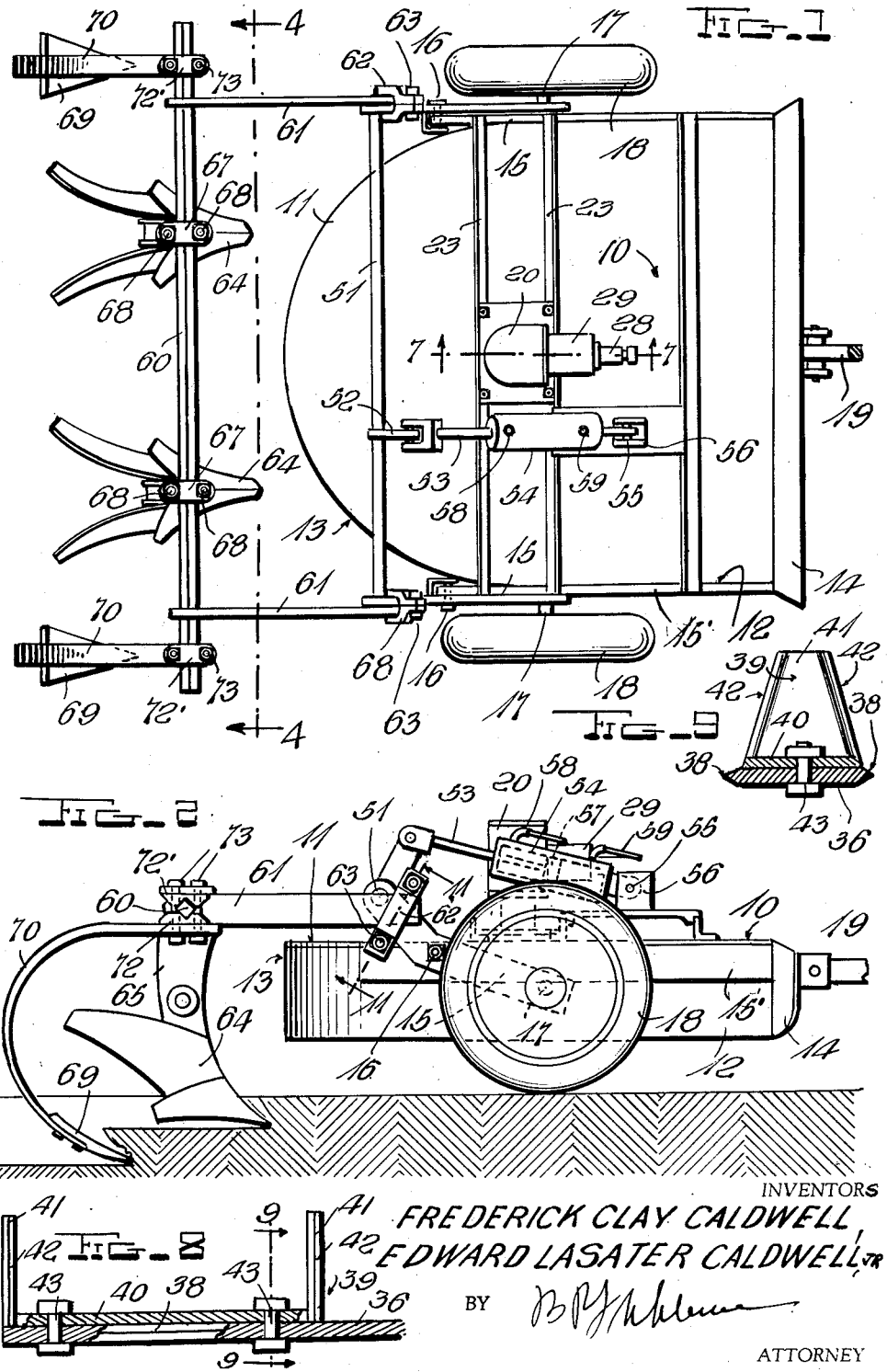

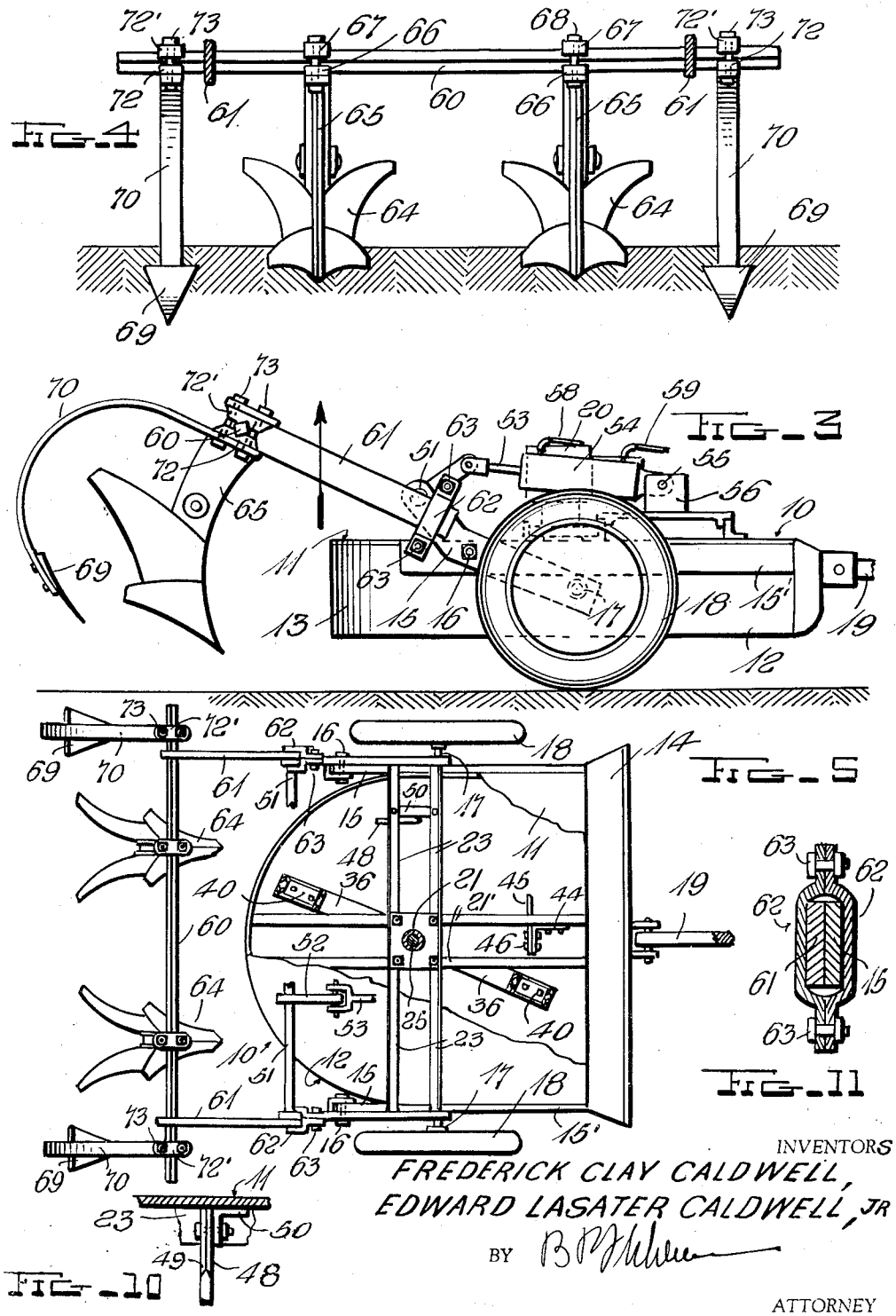

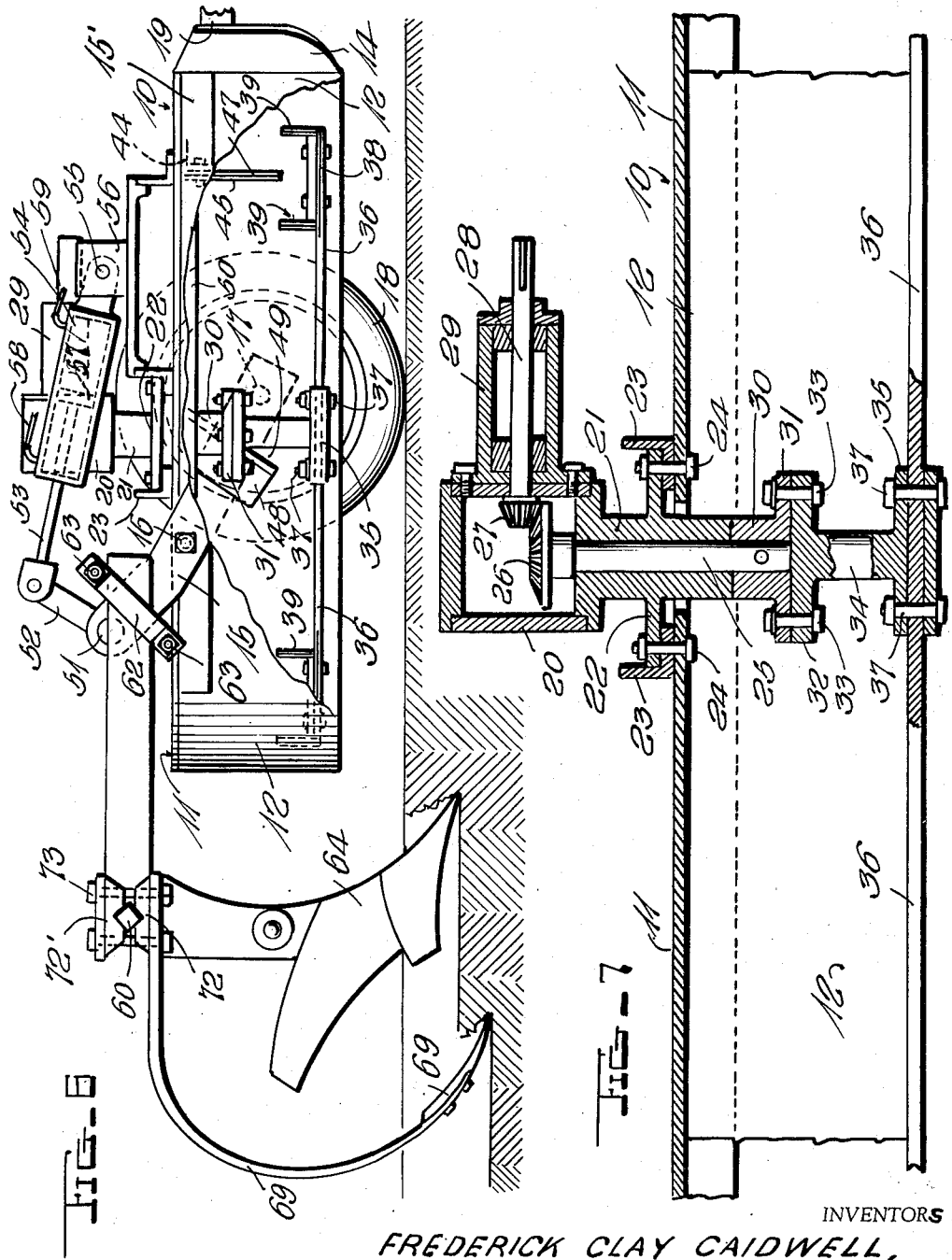

2,781,709

MEANS FOR CUTTING STALKS OR THE LIKE AND PLOWING OR CULTIVATING THE GROUND

Frederick Clay Caldwell and Edward Lasater Caldwell, Jr., Corpus Christi, Tex., assignors to E. L. Caldwell & Sons, Corpus Christi, Tex., a firm Application January 12, 1955, Serial No. 481,426

5 Claims. (Cl. 97—46.27)

The present invention relates to a machine for cutting stalks or the like and plowing or cultivating the ground, in one operation.

An important object of the invention is to provide means for raising and lowering the rotary stalk cutter and the ground engaging implements or tools, and moving the implements for a greater distance.

A further object of the invention is to provide means for mounting the tool bar which carries the ground engaging implements or tools, upon the bell cranks or levers, which in turn carry the ground engaging wheels of the machine.

A further object of the invention is to provide a machine of the above-mentioned character, which is of simplified construction, is cheap to manufacture and reliable in operation.

Other objects and advantages of the invention will be apparent during the course of the following description.

In the accompanying drawings forming a part of this application and in which like numerals are employed to designate like parts throughout same, Figure 1 is a plan view of a machine embodying our invention, Figure 2 is a side elevation of the same, showing the tool bar in the lowered position, Figure 3 is a similar view, showing the tool bar raised, Figure 4 is a transverse section taken on line 4—4 of Figure 1, Figure 5 is a plan view of the machine, parts broken away, Figure 6 is a side elevation of the machine, parts of the casing broken away and the ground engaging wheel upon the near side of the casing removed, Figure 7 is an enlarged longitudinal section taken on line 7—7 of Figure 1, Figure 8 is a fragmentary side elevation of one end of the rotary blade and cutting element, parts in section, Figure 9 is a transverse section taken on line 9—9 of Figure 8, Figure 10 is a front edge elevation of the side cutter or blade, Figure 11 is a transverse section taken on line 11—11 of Figure 2.

We have shown a cutting machine for cutting the stalks of plants, such as cotton, although it may be used to cut brush. The machine comprises a casing 10 including a top 11, sides 12 and a rear end 13. The rear end is preferably cylindrically curved. The forward end of the casing 10 is open and flares outwardly, as shown at 14.

Disposed outwardly of the sides 12 are bell cranks or levers 15, pivotally secured to horizontal bars 15', rigidly mounted upon the sides 12 to swing vertically with relation to the sides, by means of pivots or axles 16. The bell cranks or levers 15 are preferably formed of flat rigid strap iron. Rotatably mounted upon the forward ends of the bell cranks 15 as shown at 17 are ground engaging wheels 18. A draft appliance 19 is suitably secured to the forward end of the casing, as shown.

The numeral 20 designates a gear casing, rigidly mounted upon a vertical bearing 21, having a horizontal flange 22. This flange is mounted between transverse angle irons 23 arranged above and rigidly secured to the top 11. The flange 22 is rigidly secured to the angle irons by bolts 24. The bearing 21 extends downwardly through an opening in the top 11 and has a vertical shaft 25 mounted therein, driven by a bevel gear 26, which is driven by a beveled gear 27 rigidly secured to a drive shaft 28. This drive shaft is journaled in a sleeve 29 secured to the casing 20. The shaft 28 extends forwardly for suitable connection with the power take-off of the tractor.

A sleeve 30 is clamped to the lower end of the vertical shaft 25 and is provided with a disc 31, integral therewith, and this disc is connected with a companion disc 32 by bolts 33. Formed integral with the disc 32 is a coupling shaft 34 having a horizontal sleeve 35 integral with its lower end. This sleeve is rectangular in cross section and receives a horizontal rotary blade 36, clamped therein by bolts 37. The opposite edges of the blade 36 are sharpened as shown at 38.

Cutting elements 39 are mounted upon the opposite ends of the blade 36. Each cutting element comprises a horizontal plate 40, provided at its opposite ends with vertical blades 41 rigidly secured thereto and preferably formed integral therewith. The blades 41 are at right angles to the plates 40 and extend above the same. The blades 41 taper upwardly and have their opposite inclined edges sharpened as shown at 42. Each horizontal plate 40 is arranged between the sharpened edges 38 inwardly of the same and the blades 41 extend above the edges 38. The blades 41 have their faces extending transversely of the blade 36 and circumferentially in the path of travel of the blade 36. The inclined edges 42 of the blades 41 tend to elevate the material. Each plate 40 and the blade 36 have openings formed therein for receiving bolts 43 which clamp the plate to the blade 36, as shown.

Rigidly mounted upon one longitudinal angle iron 21' is a vertical bracket 44, in the form of an angle iron, and a center upstanding blade 45 is rigidly mounted upon the bracket 44 by bolts 46. The angle irons 21' are arranged beneath the top 11 and rigidly secured thereto. These angle irons 21' are arranged near and upon opposite sides of the central longitudinal axis of the casing 10. The center blade 45 is upstanding and is preferably slightly vertically inclined and has a sharpened edge 47. The center blade 45 is arranged adjacent to the central longitudinal axis of the casing 10 and arranged between the rows of plants, such as cotton plants. The blade 45 is stationary and has its faces extending transversely of the longitudinal axis of the casing 10 and the rows of plants. The numeral 48 designates an upstanding side blade having a sharpened edge 49. This blade is vertically inclined in the rearward direction. The blade 48 is mounted upon and angle iron 50, mounted upon the transverse angle irons 23. The blade 48 is arranged near the side of the casing 10. The faces of the blade 48 extend longitudinally of the longitudinal axis of the casing 10.

The bell cranks 15 have their rear ends connected by a horizontal transverse operating gar 51 rigidly secured thereto. This operating bar has an upstanding crank 52 rigidly mounted thereon, having pivotal connection with a connecting rod 53. The numeral 54 designates the cylinder of a hydraulic device and this cylinder is pivoted at 55, upon a support 56, in turn rigidly mounted upon the top of the casing 10. The cylinder 54 is adapted to be swung vertically. The cylinder 54 receives a plunger 57, which is secured to the connecting rod 53. Pipes 58 and 59 lead into the opposite end of the cylinder 54, to supply an exhaust pressure into and from the ends of the cylinder. The supply and exhaust of the fluid pressure is controlled by suitable valve means, not shown. When fluid pressure is introduced into the rear end of the cylinder 54, the plunger 57 moves forwardly, which pulls upon the connecting rod 53, which in turn swings the bell cranks 15 upon their pivots, lowering the forward ends of the bell cranks and raising their rear ends. By proper manipulation of the valve means, the fluid pressure may be held behind the plungers 57 for a selected time, thereby retaining the bell cranks in the adjusted position. When the fluid pressure is introduced into the forward end of the cylinder 54 and exhausted from its rear end, the rear ends of the bell cranks 15 are lowered and their forward ends raised. By proper manipulation of the valve means, the pressure may be held within the cylinder forwardly of the plungers 57. It is thus apparent that the plungers 57 may be shifted to a selected position and locked in the adjusted position.

Disposed at the rear of the casing 10 and operating rod 51 is a horizontal transverse tool bar 60 which is preferably square in cross section. This tool bar extends through openings formed in the rear ends of arms or strap irons 61, and is preferably welded in place within these openings. The arms 61 are disposed outwardly of the rear ends of the bell cranks 15, adjacent to the operating bar 51, and are clamped to the rear ends of the bell cranks 15. When the arms 61 are in the lowered generally horizontal position, the rear ends of the bell crank 15 are slightly vertically inclined and these arms 61 are therefore arranged at an obtuse angle with respect to the bell cranks. The means which clamps the arms 61 to the bell cranks includes plates 62, disposed upon the opposite sides of the bell cranks 15 and arms 61 are connected by volts 63. This rigid attachment may be effected by other means, as desired.

The tool bar 60 is designed to carry ground engaging implements. Attached to this tool bar are middle busters or plow shears 64 rigidly secured to plow stocks 65, in turn rigidly mounted upon the tool bar 60. Each plow stock may be equipped with a clamping jaw 66 arranged beneath the tool bar 60 and opposite to an upper jaw 67, and these jaws are connected by bolts 68. Other means may be employed to clamp the stocks to the bar 60. Arranged near the outer ends of the tool bars 60 and outwardly of the arms 61 are chisel plow shears 69, carried by stocks 70, extending upwardly and secured to clamping jaws 72, connected with coacting clamping jaws 72' by bolts 73. These jaws and bolts clamp the stocks 70 to the tool bar 60. Jaws 66 and 72 are identical and jaws 67 and 72' are identical.

The arrangement is such that the middle buster plow shears 64 travel down the centers of the rows of cotton plants or the like and plow under the cotton plants, which have been perviously severed by the rotary cutter. The chisel plow shears 69 travel down the spaces between the rows of cotton plants, near the centers of such spaces, and these chisel plow shears penetrate the earth quite deeply for approximately ten to twelve inches. This action loosens the soil so that when the next year's crop is planted on the top of the plowed row produced by the chisel plow shears, the plants have the broken ground beneath them which has absorbed the winder moisture, which results in a better crop. If desired, a fertilizer attachment may be mounted upon the tool bar adjacent to each chisel plow shear and the fertilizer fed downwardly through the spout from the fertilizer attachment into the furrow produced by the chisel plow shear. When this is done, the following year, the plants will not only have a loose ground beneath them but also have a strip of fertilizer directly beneath them. We accomplish four operations at one time, namely, cutting the stalks, plowing under the cut stalks, plowing the new row, and fertilizing the new row. As far as we known, this has not been done before.

Particular attention is called to the fact that the rear end of each arm 61 adjacent to the tool bar 60 is spaced from the pivot 16 for almost twice the distance that the axle 17 is spaced from the pivot 16. In other words, the arms 61 form with rear portions of the bell cranks 15, arms which are practically twice as long as the arms of the bell cranks arranged upon the forward sides of the pivots 16. A marked advantage is obtained by mounting the arms 61 upon the bell cranks, in the manner stated. The advantage is that the rear ends of the arms 61 are swung vertically for about twice the distance that the forward ends of the bell cranks 15 are swung, when the bell cranks are turned upon their pivots. This is necessary to elevate the chisel plow shears above the ground, without raising the casing 10 unduly, thereby saving unnecessary work. The construction is simple and renders it possible for a single hydraulic device to be used in lowering the wheels of the machine and raising and lowering the tool bar.

The rotary cutter cuts two rows of stalks at one time. The rotary cutter cuts one row of stalks against the central blade 45 and cuts the other row of stalks against the side blade 48. The plow shears 64 travel centrally down the two rows being cut, and the plow shears 69 travel down the spaces between the previously cut pairs of rows, near the centers of such spaces.

It is to be understood that the form of our invention herewith shown and described is to be taken as a preferred example of the same and that various changes in the shape, size and arrangement of parts may be resorted to, without departing from the spirit of the invention or the scope of the subjoined claims.

Having thus described our invention, we claim:

1. A machine for cutting a plurality of rows of cotton or like plants and plowing under the cut plants, comprising a plurality of transversely spaced plowshares, a frame common to said plowshares, vertically swinging levers pivotally mounted upon said common frame and extending in the direction of travel of said common frame, wheels mounted upon said levers, arms carried by said levers to swing therewith, a transverse bar arranged near the rear end of the common frame and mounted upon said arms, stocks mounted upon the transverse bar and carrying the plowshares, the levers and arms being so arranged that when the plowshares are in the lowered position and are plowing the ground said wheels are in the lowered position and are supporting the common frame and plowshares and regulating the depth that the plowshares cut, means to swing said levers upon their pivots to hold said wheels in engagement with the ground and raise the common frame and thereby cause the common frame to raise said plowshares and to swing said arms to further raise the plowshares by such swinging movement, stalk cutting mechanism for severing stalks of the plants and including means movable with relation to the common frame, means serving to mount the severing mechanism upon the common frame so that the severing mechanism is supported by the common frame and is raised and lowered by the vertical adjustment of said common frame, and power-operated means to drive the severing mechanism.

2. A machine for cutting a plurality of rows of cotton or like plants and plowing under the cut plants, comprising a plurality of transversely spaced plowshares, a single frame common to said plowshares, vertically swinging levers pivotally mounted upon said single common frame and extending in the direction of travel of said single common frame, wheels mounted upon said levers and disposed upon one side of the pivots of said levers, arms carried by said levers to swing therewith and extending upon the opposite sides of the pivots of said levers, a transverse bar arranged near the rear end of the single common frame and mounted upon the rear ends of said arms, stocks mounted upon the transverse bar and carrying the plowshares, the levers and arms being so arranged that when the plowshares are in the lowered position and are plowing the ground said wheels are in the lowered position and are supporting the single common frame and plowshares and regulating the depth that the plowshares cut, power-operated means to swing said levers upon their pivots to hold said wheels in engagement with the ground and raise the single common frame and said plowshares and to swing said arms to further raise the plowshares by such swinging movement, rotatable stalk severing means for severing the stalks of the plants in a plurality of rows and at points above the ground, means serving to mount the severing means upon the single common frame so that the severing means is supported by the single common frame and is raised and lowered by the vertical adjustment of said single common frame, and power-operated means to drive the severing means.

3. A machine for cutting a plurality of rows of cotton or like plants and plowing under the cut plants, comprising a plurality of transversely spaced plowshares, a frame common to said plowshares, vertically swinging levers pivotally mounted upon said frame and extending in the direction of travel of said common frame, wheels mounted upon said pivoted levers at points forwardly of said pivots, arms extending rearwardly of said levers, means to bodily mount said arms upon said levers at points rearwardly of the pivots of said levers, a transverse bar arranged near the rear end of the common frame and mounted upon the rear end portions of said arms, stocks mounted upon the transverse bar and carrying the plowshares, the levers and arms being so arranged that when the plowshares are in the lowered position and are plowing the ground said wheels are in the lowered position and are supporting the common frame and plowshares and regulating the depth that the plowshares cut, power-operated means to swing the levers upon their pivots to hold said wheels in engagement with the ground and raise the common frame and said plowshares and to swing said arms to further raise the plowshares by such swinging movement, stalk severing means for severing the stalks in a plurality of rows, means serving to mount the stalk severing means upon the common frame so that the severing means is supported by the common frame and is raised and lowered by the vertical adjustment of said common frame, and power-operated means to drive the severing means.

4. A machine for cutting a plurality of rows of cotton or like plants and plowing under the cut plants, comprising a plurality of transversely spaced middle buster plowshares arranged to travel down the rows of plants, a plurality of transversely spaced chisel plowshares arranged to travel down the spaces between the plant rows, a frame common to said plowshares, vertically swinging levers pivotally mounted upon said common frame and extending in the direction of travel of said common frame, wheels mounted upon said levers, a transverse bar arranged near the rear end of the common frame, means to mount the transverse bar upon said levers so that when the free ends of the levers are swung downwardly said levers raise the transverse bar, stocks mounted upon the transverse bar and carrying all of said plowshares, the levers and mounting means being so arranged that when the plowshares are in the lowered position and are plowing the ground said wheels are in the lowered position and are supporting the common frame and plowshares and regulating the depth that the plowshares cut, power-operated means to swing the levers upon their pivots to hold said wheels in engagement with the ground and raise the common frame and all of the plowshares and to further raise the plowshares by such swinging movement, power-operated stalk severing means for severing the stalks in a plurality of rows, means to mount the severing means upon the common frame so that the severing means is supported by the common frame and raised and lowered by the vertical adjustment of such common frame, and power-operated means to drive the severing means.

5. A machine for cutting a plurality of rows of cotton or like plants and plowing under the cut plants, comprising a plurality of transversely spaced plowshares, a frame common to said plowshares, generally vertically swinging lever devices pivotally mounted between their ends upon the common frame and extending longitudinally of the direction of travel of said common frame, said lever devices having their rear portions disposed rearwardly of the pivots considerably longer than their forward portions disposed forwardly of such pivots, wheels mounted upon the forward portions of said lever devices, a transverse bar arranged near the rear end of the common frame and mounted upon the rear portions of said lever devices, stocks mounted upon the transverse bar and carrying the plowshares, the lever devices being so constructed that when the plowshares are in the lowered position and are plowing the ground said wheels are in the lowered position and are supporting the common frame and plowshares and regulating the depth that the plowshares cut, means to swing the lever devices upon their pivots to hold said wheels in engagement with the ground and to raise the common frame and said plowshares and to further raise the plowshares by such swinging movement, stalk cutting mechanism for severing the stalks in a plurality of rows, means mounting the stalk severing mechanism upon the common frame so that the severing mechanism is supported by the common frame and is raised and lowered by the vertical adjustment of said common frame, and power-operated means to drive the severing mechanism.

References Cited in the file of this patent

UNITED STATES PATENTS

| | | |
|---|---|---|
| 929,873 | Peeples | Aug. 3, 1909 |
| 1,219,107 | Jones | Mar. 13, 1917 |
| 1,417,381 | Hengst | May 23, 1922 |
| 1,969,684 | Bird | Aug. 7, 1934 |

FOREIGN PATENTS

| | | |
|---|---|---|
| 2,822 | Great Britain | of 1884 |